United States Patent [19]

Müller

[11] Patent Number: 4,509,936
[45] Date of Patent: Apr. 9, 1985

[54] TOOTHED BELT DRIVES

[75] Inventor: Alexander Müller, Höxter, Fed. Rep. of Germany

[73] Assignee: Arntz-Optibelt KG, Höxter, Fed. Rep. of Germany

[21] Appl. No.: 531,497

[22] Filed: Sep. 12, 1983

[51] Int. Cl.³ .............................................. F16H 7/00
[52] U.S. Cl. ................................ 474/148; 474/153; 474/205; 198/494
[58] Field of Search ............... 474/148, 202, 153, 242, 474/205, 164; 198/494, 498; 56/98

[56] References Cited

U.S. PATENT DOCUMENTS

| | | | |
|---|---|---|---|
| 3,656,359 | 4/1972 | Dorf et al. | 474/148 |
| 3,866,483 | 2/1975 | Smith | 474/205 |
| 4,003,269 | 1/1977 | Haines . | |
| 4,072,062 | 2/1978 | Morling et al. . | |
| 4,198,875 | 4/1980 | Schneider | 474/205 |

FOREIGN PATENT DOCUMENTS

| | | | |
|---|---|---|---|
| 567474 | 5/1958 | Belgium | 474/205 |
| 1939381 | 2/1971 | Fed. Rep. of Germany . | |
| 1312164 | 4/1973 | United Kingdom | 474/205 |

Primary Examiner—James A. Leppink
Assistant Examiner—Frank H. McKenzie, Jr.
Attorney, Agent, or Firm—Penrose Lucas Albright

[57] ABSTRACT

A toothed belt drive which is particularly suitable for use in harvesting machines has belt teeth which are trapezoidal in plan and cross-section perpendicular to the direction of motion of the belt. The belt teeth are alternately oriented with the larger side edge of the base adjacent opposite side edges of the strip-like belt. The belt teeth are adapted to engage in recesses in a belt pulley which are complementarily shaped. The recesses in the belt pulley are laterally open adjacent the wider side edge to enable any foreign matter entering said recesses to be readily ejected therefrom.

3 Claims, 4 Drawing Figures

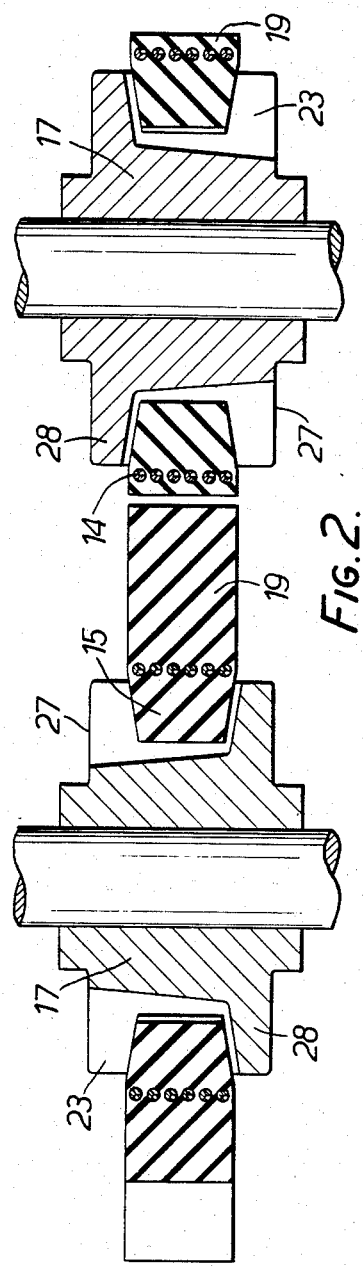
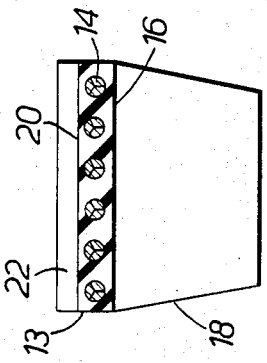
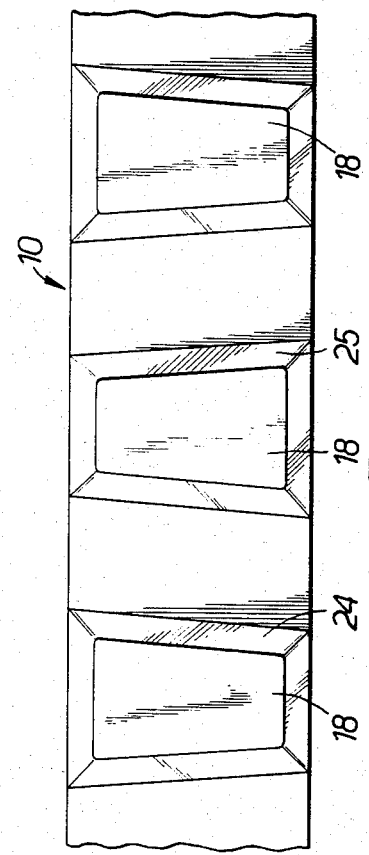

TOOTHED BELT DRIVES

BACKGROUND OF THE INVENTION

1. Technical Field

The present invention relates to toothed belt drives, and particularly, but not exclusively, to such belt drives for use in harvesting machines.

2. Prior Art

DE-A No. 1 939 381 discloses a toothed belt transmission of the type having belt teeth which are trapezoidal in cross-section perpendicular to the direction of movement.

U.S. Pat. No. 4,003,269 discloses a toothed belt transmission having belt teeth with trapezoidal base surfaces on the face of the belt, the teeth having the smaller and larger parallel side edges of the base of alternate teeth parallel with respective ones of the lateral edges of the strip-like elongate belt. This known toothed belt drive is not only used for the positive and thus non-slip transmission of force, but is also used in a frictionally locking bevel gear transmission.

U.S. Pat. No. 4,072,062 shows belt pulleys constructed with laterally open recesses for self-cleaning purposes.

SUMMARY OF THE INVENTION

The invention is based on the problem of further developing a toothed belt drive so that under working conditions during the harvesting process, the strength bearer which typically takes the form of a traction strand coil incorporated helically in the strip part of the belt, the shape of the teeth on the belt, and the belt pulleys are so shaped to produce continuous exact guidance and a self-cleaning effect if particles of harvested material and/or clods of earth should fall into the region of the teeth on the belt and/or the pulleys.

The present invention accordingly provides a toothed belt drive including a strip-like belt having side edges and teeth projecting from a surface of said belt, said teeth being trapezoidal in plan and in cross-section perpendicular to the direction of motion of said belt, and at least one belt pulley having recesses defined therein which are of substantially complementary shape to the shape of said belt teeth and are adapted to mesh with said belt teeth, said belt teeth each having a trapezoidal base in contact with the surface of said strip-like belt, said trapezoidal base having smaller and larger opposite parallel side edges which alternately extend parallel to a respective one of said side edges of said belt, and said recesses in said belt pulleys being laterally open at one side which is adjacent the larger side edge of the base of a tooth engaged therein, the other side of said recess being closed.

Preferably the perpendicular distance between the side edges of the base of the teeth is equal to the width of said strip-like belt.

The belt pulleys are constructed with an even number of tooth recesses which are alternately oriented in opposite senses to correspond to the orientation of the teeth. Whichever lateral side face of each recess happens to have the largest cross-sectional area is constructed with no defining lateral wall so that it is possible for any particles of harvested material and/or clods of earth which happen to drop between the conveyor belts and/or belt wheels to flow out sideways, virtually without hindrance. The alternate arrangement of smallest peripheral cross-sectional area side walls with the inner wall inclined towards the bottom of the pocket assists bilateral accurate guidance of the belt, since by virtue of the drive configurations which typically occur there are at least two teeth which are simultaneously meshing with a drive pulley.

BRIEF DESCRIPTION OF THE DRAWINGS

FIG. 2 shows on an enlarged scale a section taken on the line II—II in FIG. 3;

FIG. 3 shows on an enlarged scale a plan of a portion of the belt used in the toothed belt drive of FIGS. 1 and 2; and FIG. 4 shows on an enlarged scale, a section taken on the line IV—IV in FIG. 1.

DESCRIPTION OF A PREFERRED EMBODIMENT

Figure 1:
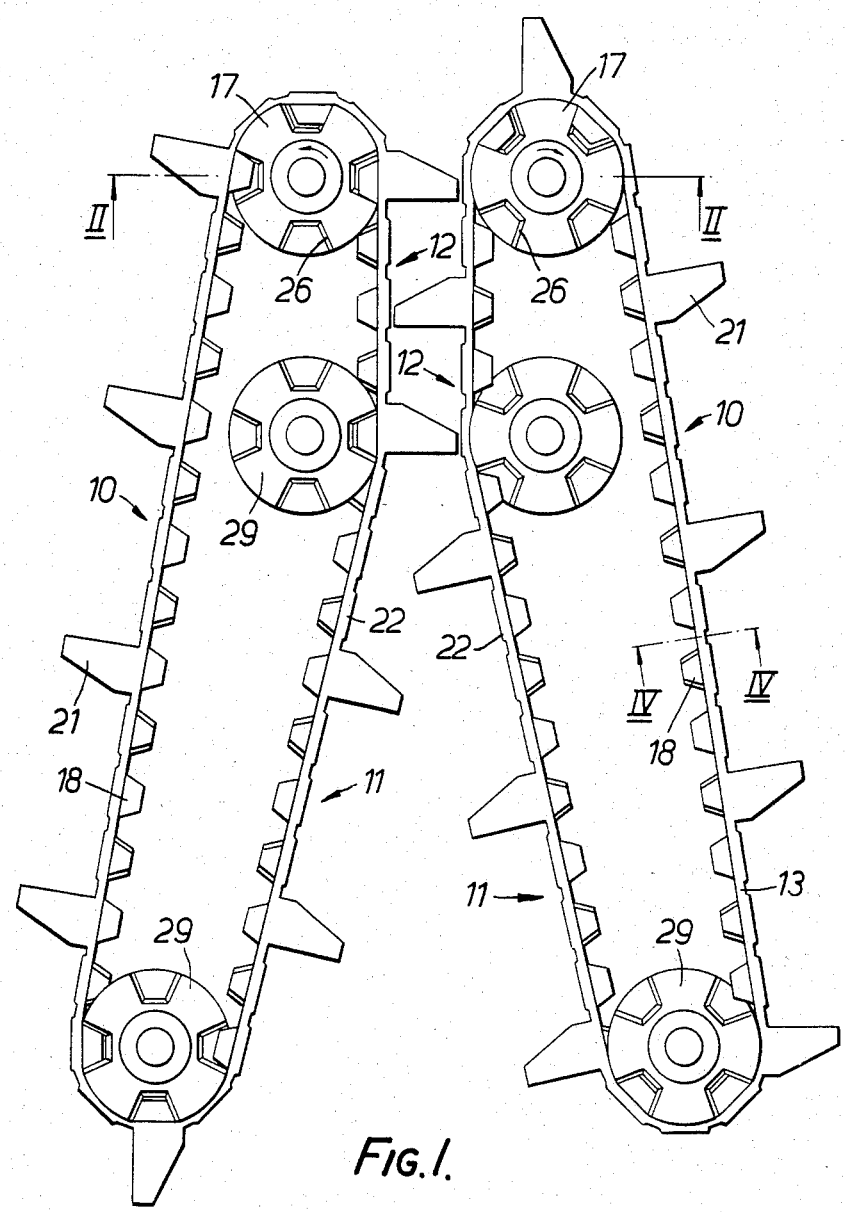
FIG. 1 shows a plan view of a pair of gears of a toothed belt drive.

FIG. 1 shows the essential component parts of a toothed belt drive which is here shown, by way of example, in the form of a pair of co-operating gears defining a draw-in passage for a single or multi-row type of machines for harvesting stalk crops. The oppositely disposed endless belts 10 define a wedge shaped part of a conveyor path with the belt portions 11, and a parallel part with the parallel belt portions 12. According to the nature of the harvesting machine, it is also possible for the effective planes of the two co-operating gears to be designed on an unequal height level. In the case of multi-row types, it may even be expedient for the corresponding belts 10 of each pair of gears to be of different lengths.

FIGS. 2 and 4 show that the strip-like portion 13 of the belt 10 has across its entire width a strengthbearer which consists of an Aramide cord strand 14 which serves as a helically-wound tension strand. In a zone 15 below the cord 14, there are formed on the belt surface 16 the belt teeth 18 which are required for power transmission and for movement in synchronism with the belt pulley 17. These belt teeth 18 are trapezoidal in all three planes, and their trapezoidal bases are oriented alternately in the transverse direction of the belt 10 (FIG.3). In a zone 19 above the cord 14 there are integrally moulded at regular intervals on the other surface 20 of the belt, drive members 21 which are preferably in geometric concordance with the tooth pitch. In the longitudinal portions on belt surface 20 between the drive members 21 pedestal-shaped platforms 22 are disposed in the same sequence and positions as the belt teeth 18 on the other surface of the belt. In order to drive the belts 10, in the case of the illustrated cooperating pair of gears, the belt pulleys 17 rotate in opposite directions and in synchronism which is ensured by harvesting machine drive elements, not shown. When stalk crops are being conveyed, the drive members 21 and in particular the longitudinal zone of the belts 10 are loaded in the parallel belt portion 12.

The transmission of power from the belt pulleys 17 to the belts 10 occurs in form-locking or positive manner via the belt teeth 18 which are integrally moulded on the strip-like belt portion 13 and which engage in substantially correspondingly shaped recesses 23 in the belt pulleys 17. For exact conformity with the non-axially parallel belt tooth flanks 24, 25, the recesses 23 in the belt pulleys 17 are in a co-axial direction constructed with correspondingly inclined working faces 26. In the same way as the belt teeth 18 the recesses 23 are orintated alternately in opposite transverse directions. In each recess 23, the widest lateral side 27 of the recess is left open which permits a self-cleaning effect when, as is inevitable, particles of harvested crop and clods of earth fall in. The closed opposite side 28 of the recesses likewise serves for the necessary lateral guidance of the belt 10 and prevents the belt running sideways off the pulley 17. The position of the closed and open sides alternates so that although the illustrated pulleys each have eight recesses, only four are visible in FIG. 1.

The jockey, tensioning and/or reversing wheels 29 required for driving purposes, in addition to the belt pulleys 17 need not necessarily be of the same construction as the belt pulley 17. For these functions, wheel members may be used which have no synchronising element. In the case of considerable spans between the wheels, supporting of the belt 10 on the tooth side is provided for by idler wheels and/or slide rails, not shown, or more rectinlinear belt guidance.

What is claimed is:

1. A toothed belt drive including
    a strip-like belt having side edges and teeth projecting from a surface of said belt, said teeth being trapezoidal in plan and in cross-section perpendicular to the direction of motion of said belt, and
    at least one belt pulley having recesses defined therein which are of substantially trapezoidal shape corresponding to the shape of said belt teeth and are adapted to mesh with said belt teeth,
    said belt teeth each having a trapezoidal base in contact with the surface of said strip-like belt, said trapezoidal base having smaller and longer opposite parallel side edges which alternately extend parallel to a respective one of said side edges of said belt, and
    said recesses in said belt pulleys being laterally open at one side which is adjacent the larger side edge of the base of a tooth engaged therein, the other side of said recess being closed.

2. A toothed belt drive according to claim 1, in which the perpendicular distance between the side edges of the base of the teeth is equal to the width of said striplike belt.

3. A toothed belt drive including a belt having teeth defined thereon and a belt pulley having recesses adapted to engage said teeth, said teeth and belt pulley recesses being trapezoidal in plan and cross section and alternately orientated such that the longer parallel side edge is alternately adjacent opposite side edges of the belt, the recesses in said pulley being open at their wider side.

* * * * *

UNITED STATES PATENT AND TRADEMARK OFFICE
CERTIFICATE OF CORRECTION

PATENT NO. : 4,509,936
DATED : April 9, 1985
INVENTOR(S) : Alexander Muller

It is certified that error appears in the above-identified patent and that said Letters Patent is hereby corrected as shown below:

Insert on the first page of the patent as item [30] in the first column:

-- Foreign Application Priority Data
Sept. 13, 1982  Federal Republic of Germany    32 33 891  --

Signed and Sealed this
Twenty-ninth Day of July 1986

[SEAL]

Attest:

DONALD J. QUIGG

Attesting Officer    Commissioner of Patents and Trademarks